(12) United States Patent
Hinojosa et al.

(10) Patent No.: US 12,327,221 B2
(45) Date of Patent: Jun. 10, 2025

(54) AUTOMATED ORDER FULFILMENT WITH OPPORTUNISTIC DECANT OPERATIONS

(71) Applicant: Dematic Corp., Grand Rapids, MI (US)

(72) Inventors: Arturo Hinojosa, Austin, TX (US); Paul Hunckler, Westfield, IN (US); Bai Zou, Houston, TX (US); Jack Tuinstra, Belmont, MI (US)

(73) Assignee: Dematic Corp., Grand Rapids, MI (US)

( * ) Notice: Subject to any disclaimer, the term of this patent is extended or adjusted under 35 U.S.C. 154(b) by 582 days.

(21) Appl. No.: 17/592,290

(22) Filed: Feb. 3, 2022

(65) Prior Publication Data
US 2022/0245583 A1 Aug. 4, 2022

Related U.S. Application Data

(60) Provisional application No. 63/145,264, filed on Feb. 3, 2021.

(51) Int. Cl.
*G06F 7/00* (2006.01)
*B65G 1/137* (2006.01)
*G06Q 10/0875* (2023.01)

(52) U.S. Cl.
CPC ....... *G06Q 10/0875* (2013.01); *B65G 1/1378* (2013.01)

(58) Field of Classification Search
CPC .................. G06Q 10/0875; B65G 1/1378
(Continued)

(56) References Cited

U.S. PATENT DOCUMENTS 9,315,323 B2  4/2016 Schubilske
10,329,089 B2  6/2019 Kasper et al.
(Continued)

FOREIGN PATENT DOCUMENTS

CA  2956713 C  2/2023
EP  3781483 A4  12/2021
(Continued)

OTHER PUBLICATIONS

International Search Report and Written Opinion of the International Searching Authority from corresponding Patent Cooperation Treaty (PCT) Application No. PCT/IB2022/50964, indicated completed on Mar. 17, 2022.
(Continued)

*Primary Examiner* — Yolanda R Cumbess
(74) *Attorney, Agent, or Firm* — Gardner, Linn, Burkhart & Ondersma LLP

(57) ABSTRACT

A method and system for opportunistically picking order items during decant processes. An order management system determines which items required for a pending order are depleted within a decant function or storage system and orders replenishment, such as inbound vendor cases containing the depleted required items, to the decant function. Operators at decant workstations pick the required items from the inbound vendor cases into order containers while simultaneously decanting any remaining, non-required vendor items into inventory containers. The order containers and the inventory items are stored in a storage system until all required items for an order are present therein. Once all required items are present, the items are released to a downstream picking workstation, sorter, and/or packing station. The method with opportunistic decant may enable minimized facility space requirements, labor reductions, and resource reductions while improving facility throughput.

25 Claims, 4 Drawing Sheets

(58) Field of Classification Search
USPC .................................. 700/213–216, 223, 228
See application file for complete search history.

(56) References Cited

U.S. PATENT DOCUMENTS

| | | |
|---|---|---|
| 10,427,873 B1 | 10/2019 | Mause et al. |
| 10,882,696 B2 | 1/2021 | Wan et al. |
| 11,192,718 B2 | 12/2021 | Khodl et al. |
| 2004/0146380 A1* | 7/2004 | Baker .................. B65G 1/1373 |
| | | 414/273 |
| 2007/0150383 A1 | 6/2007 | Shakes et al. |
| 2014/0350717 A1 | 11/2014 | Dagle et al. |
| 2015/0073587 A1 | 3/2015 | Miet et al. |
| 2018/0137459 A1 | 5/2018 | Jacobs et al. |
| 2020/0317450 A1 | 10/2020 | Parrott et al. |
| 2020/0334634 A1 | 10/2020 | Flynn |

FOREIGN PATENT DOCUMENTS

| | | |
|---|---|---|
| EP | 3487792 B1 | 4/2024 |
| WO | 2018092015 A1 | 5/2018 |
| WO | 2019103894 A1 | 5/2019 |
| WO | 2020006010 A1 | 1/2020 |

OTHER PUBLICATIONS

European Search Report, issued Nov. 5, 2024 in European Application No. 22749336.8.

* cited by examiner

AUTOMATED ORDER FULFILMENT WITH OPPORTUNISTIC DECANT OPERATIONS

CROSS REFERENCE TO RELATED APPLICATION

The present application claims priority of U.S. provisional application Ser. No. 63/145,264 filed Feb. 3, 2021, which is hereby incorporated by reference herein in its entirety.

FIELD OF THE INVENTION

The present invention is directed to order fulfilment methods and systems, and in particular to decant operations in order fulfillment operations.

BACKGROUND OF THE INVENTION

Order fulfillment must take place within a relatively short period of time in order to be commercially competitive and resource efficient. Inefficiencies and conflicts arise in warehouses due to the size constraints associated with warehousing and transporting items for order fulfilment, such as the amount of equipment or personnel required to carry out an order fulfilment process, continuous inventory depletion and replenishment, and other factors. Additional inefficiencies and conflicts arise in sequencing orders and compiling items for orders having multiple items. Inbound inventory is typically decanted in an upstream decanting function and the decanted items are stored as inventory in a downstream storage system or storage area. When an order is placed, the item or items required for that order that are in the storage system are released to a picking station where an operator transfers the item to an order carton. If an item required for the order is not present in the storage inventory, the order must wait or be delayed until more of that required item is decanted and placed into the inventory storage system.

Order fulfilment processing may utilize wave-based order sequencing in which multiple orders are grouped or sequenced into a large group or "wave". Typically, multiple waves are created to accommodate large order volumes to be handled and processed within a fulfilment facility or warehouse during a given period (i.e. a 4-hour period). The quantity of orders within a wave may be chosen based on the hardware capacity of the fulfilment facility, such as the number of item handling apparatuses and/or workstations in the facility that are available for the order fulfilment processes being performed. Further, various types of waves may be created corresponding to different types of hardware available. For example, in a warehouse facility having a tray sortation system or sorter with fifty available trays or order destinations, a sortation wave may include fifty orders to be fulfilled, corresponding to the fifty available trays. Each of the orders of the sortation wave to be directed to one of the fifty sorter trays. If the facility expects to process six thousand orders in a particular period, one hundred twenty sortation waves will be created to accommodate all of the orders. Further, if the fulfilment facility includes ten workstations, workstation waves may be provided and each workstation wave may include ten sortation waves to be handled within the workstation wave. Thus, the control system creates a total of twelve workstation waves, and each of the workstation waves includes a total of five hundred orders to be handled within each workstation wave.

In the provided example, the fulfilment control system selects one of the workstation waves to be processed first. The ten workstations are fed items to pick and segregate to fulfil the orders within the ten sortation waves of the selected workstation wave. The ten workstations work in cooperation with one another to complete the workstation wave as efficiently as possible. Once the selected workstation wave is completed, all items for the ten sortation waves are then ready for sortation. Once the first workstation wave is complete, the fulfilment control system may select the next workstation wave to begin processing it. The fulfilment control system selects one of the ten sortation waves of the first workstation wave to be processed first. All orders of the selected sortation wave are completed and transferred to a sorter tray before the control system selects the next sortation wave for processing.

SUMMARY OF THE INVENTION

The present invention provides a method for fulfilling an order in an order fulfilment center utilizing opportunistic picking or forward picking during the decant processes of the order fulfilment process. Thus, the operator at the decant workstation is participating in the order picking or consolidation process, thereby relieving the downstream pick operators (i.e. order picking operators) of some portion of the order picking process or eliminating the need for downstream pick operations. Order picking or "pre-picking" at the decant stage may be otherwise referred to as "opportunistic decant". The present invention is particularly advantageous for optimizing floor space usage and throughput efficiency. The method is particularly well suited for use with order fulfilment systems utilizing an automated storage and retrieval system and/or a unit sortation system. For example, the method may utilize a Dematic Multishuttle® storage system and a Dematic cross belt unit sorter as marketed by Dematic Corp. of Grand Rapids, MI The automated storage and retrieval system may be configured as an automated sequencing or random buffer to store, sequence, and release pre-picked order containers (e.g. order or pick totes) and/or inventory containers (e.g. inventory totes). The sequencing or random buffer is operable to retrieve any receptacle within the buffer at any time, such that a particular receptacle need not wait for another receptacle to be retrieved before the particular receptacle can be retrieved. It will be appreciated that orders may be completely picked or filled and ready to ship directly following the opportunistic decant process, and as such, may bypass the sequencing buffer.

The present invention provides a method of operating an integrated automated order fulfillment system that uses opportunistic picking operations at a forward pick location during inventory replenishment processes (i.e. a forward pick decant operation) to pick or pre-pick line items for pending orders. Thus, the picking or order fulfilment process begins with the decant process. The order management system, e.g. a warehouse management system (WMS) or warehouse control system (WCS), controls the replenishment of all forward pick locations within the system. The decant workstations at the forward pick location may be one of various types of workstations, such as goods to person (GTP) workstations or automated goods to robot (GTR) workstations. The decant workstations are in transport communication with an automated storage system, sequencer, or random buffer (e.g. an automated storage and retrieval system or the like) and/or a manual storage or selection area.

The method facilitates inventory replenishment at the decant workstations or the automated storage system to efficiently provide inventory to satisfy order requirements for orders that are currently being filled or handled. The method facilitates facility management in a manner that preferably reduces or eliminates shortages or starvations in inventory throughout the facility.

This method operates with waveless or dynamic order groupings, hereinafter referred to as dynamic groups and may also be referred to as "sliding bubbles" of order groupings. The method groups multiple pending orders into dynamic sets or dynamic "bubbles" of orders to be fulfilled along with one another (e.g. concurrently or in succession with one another) such that opportunistic decant operations are optimized to efficiently fulfil pending orders. Preferably, dynamic groups are made up of the dynamic order sets that are to be processed together in a dynamic manner. Dynamic groups enable individual orders and/or portions or segments of order sets to be dynamically sequenced (i.e. re-sequenced or reshuffled) within the decant/pick/handling order. For example, dynamic groups enable the order management system to optimize decant operations for full vendor cases such that an entire vendor case may be pre-picked for orders in the dynamic group which are to be filled in the ensuing fulfilment period. In other words, the method does not require the completion of one wave of orders before moving to the next wave. As individual orders in a current order set of the dynamic group are completed/fulfilled (i.e. decanted, buffered, sorted, and/or shipped), other orders are continuously added or re-sequenced from one or more of the other order sets of the dynamic group to the current order set, as a function of the required goods for the current order set, the full vendor cases available to be called up to satisfy at least some of the requirements of the current order set, and the requirements of the other order sets of the dynamic group that also require items from the full vendor cases available to be called up. The number of orders released or chosen for fulfillment in one dynamic order set and/or dynamic group determined by the capacity of the downstream resources in the order fulfilment facility and/or based on a user defined period. The order management system includes an adaptive software that continuously updates, reconfigures, and reallocates resource utilization based on order requirements, resource capacity, and facility inventory.

Order consolidation or packing operations may include selecting or picking items that were opportunistically pre-picked (i.e. pre-consolidated into a partially complete or fully complete order) and stored in the storage system, items that were decanted and stored in the storage system as inventory items for future order fulfilment, or a combination of pre-picked items and inventory items. A sortation system may be provided downstream of the storage system to consolidate and sequence order items, inventory items, and/or partially fulfilled orders in order to complete an order.

According to one form of the present invention, a method of order fulfilment is provided and includes opportunistic decant operations to fulfil orders within an order fulfilment facility. The method includes choosing an order from a pending order database or creating, with an order management system, a dynamic group with dynamic sets or bubbles of multiple orders from a pending order database. The orders in the dynamic bubbles are to be handled and fulfilled along with one another. The orders are segregated into a particular dynamic bubble as a function of which orders are required over an ensuing user defined period and/or range of orders (e.g. the next half hour, the next hour, the next four hours, etc.). The orders for a particular dynamic bubble may also be selected as a function of capacity of downstream order fulfilment processes and resources within the order fulfilment facility.

For each order in the dynamic bubble, the order management system inspects the inventory of vendor items at decant workstations as well as within the storage system of the order fulfilment facility. Based on the inventory present at the decant workstation, the system creates a shortfall database of order items that are required at the decant workstations but are not currently present at the decant workstations or storage system. The system then assigns one of the orders from the dynamic bubble of orders to one of the decant workstations and then vendor items (e.g. vendor cases, cartons, etc.) containing required items are delivered to the assigned decant workstation. The method utilizes the dynamic groups and bubbles to optimize the decant operations for a particular vendor case. It is common that vendor cases are provided in a stock keeping unit (SKU) pure manner, in which only one type of item or SKU is present in the case. Optimizing the decant process may include sequencing or re-sequencing individual orders and/or dynamic bubbles such that the current dynamic bubble being processed requires at least as many SKUs as are present in a particular vender case such that all of the SKUs decanted are pre-picked for an order in the current dynamic bubble, as opposed to being decanted into inventory.

While it is preferable that vendor cases contain at least one item required at the decant workstation for the current order as determined from the shortfall database, it will be appreciated that the system may direct vendor cases to decant workstations that do not require any of the items in the vendor case, such as during periods when order requirements are low and to utilize unused or under-used resources to replenish inventory in the storage system.

The method includes opportunistically decanting the vendor cases by simultaneously picking items required for the assigned order from the vendor items into an order receptacle and picking any present/remaining non-required vendor items into an inventory receptacle. Order receptacles containing opportunistically picked order items may be referred to or defined as pre-picked order receptacles, which contain only one or more items for a particular order that is scheduled to be processed in the same dynamic bubble. The pre-picked order receptacles may include either partially complete orders or fully complete orders. Any inventory receptacles that are created contain a plurality of inventory items required for other orders in the current dynamic bubble or for future dynamic bubbles which have not been released yet It is preferable that items decanted into inventory receptacles are segregated into SKU pure receptacles.

The pre-picked order receptacles and any inventory receptacles are transferred to an automated storage system or storage buffer where they are held and/or sequenced until they are ready to be released to a downstream function. The order management system tracks the items stored in the storage system and determines whether all of the required items for one of the orders of the current dynamic bubble are present in the storage system, in either a pre-picked order receptacle and/or an inventory receptacle. Once the pre-picked order receptacle and any required inventory receptacles are ready to be retrieved from the storage system, they are transferred from the automated storage system or storage buffer to a downstream sortation system where the order items are consolidated into individual orders. The individual orders may be placed directly into a shipping carton at the sortation system or they may be transferring to a downstream packing station.

In one aspect, some of the required items for an order are contained in at least one pre-picked order receptacle and at least one inventory receptacle and the transfer of the required order items from the automated storage system includes the transfer of the pre-picked order receptacles and the inventory receptacles containing required order items. In another aspect, after transferring the required order items from the automated storage system, the method includes transferring the required items to a downstream unit sortation system, an order fulfilment or picking workstation and then picking individual order items from either the pre-picked order receptacles and/or the inventory receptacles and placing the items into a sortation system. The sortation system is configured to sequence the individual order items into a consolidated order item group. Preferably, the sortation system is capable of transporting, storing, tracking, and releasing individual items in an independent manner. The completed, consolidated order item group is then transferred to the downstream packing station. Optionally, the pre-picked order receptacles may be transferred directly from the decant workstation to the packing station, bypassing the storage buffer and sorter. For example, the automated storage buffer and sorter may be omitted in such instances. In another aspect, the automated storage system is provided in the form of a sorter and is operable to sequence individual items into consolidated order item groups to be directed to the packing station.

Accordingly, the present invention provides a method and system for opportunistically picking order items to begin the order fulfillment process at the decant stage. The method with opportunistic decant provides for potential reductions in facility space requirements, labor requirements, and resource requirements while improving facility throughput. An order management system determines which items required for a pending order are depleted within the facility, such as at the decant workstations or in the storage system. Based on which items are depleted, the order management system calls for and directs replenishment items to the decant function, such as in the form of vendor cases containing the depleted required items. Operators at the decant workstations pick the required items from the inbound vendor cases into order containers while simultaneously decanting any non-required vendor items that are leftover into inventory containers. The order containers and the inventory items are stored in a storage system until all required items for an order are present. Once all required items are present, the items are released to a downstream picking workstation, sorter, or packing station. The inventory items may be released along with the order containers and the inventory items and order containers may be consolidated at a downstream process in order to fulfil orders in an efficient manner.

These and other objects, advantages, purposes and features of this invention will become apparent upon review of the following specification in conjunction with the drawings.

DESCRIPTION OF THE PREFERRED EMBODIMENTS

Figure 1A:
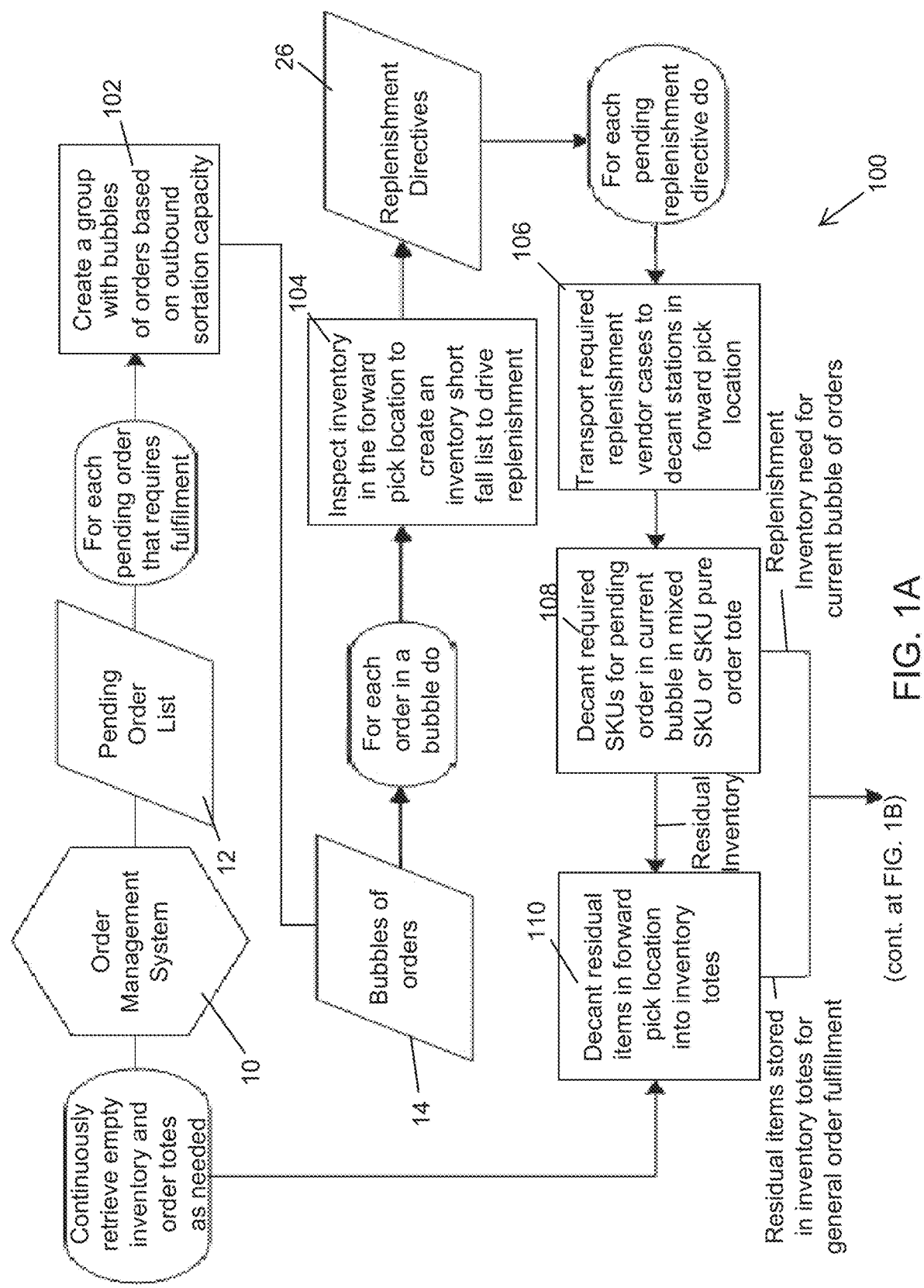
FIGS. 1A and 1B are sequential diagrams for a method for order fulfillment with opportunistic decant operations to fulfil orders within an order fulfillment facility, in accordance with the present invention.

Referring now to the drawings and the illustrative embodiments depicted therein, a method 100 for order fulfilment includes opportunistically picking items during decant operations to begin the order fulfilment processes for pending orders while simultaneously decanting inbound vendor cartons or cases 28 to replenish depleted inventory in the order fulfilment facility 8. The method 100 is particularly well suited for use in order fulfilment facilities utilizing automated storage and retrieval systems and unit sortation systems. The method is particularly well-suited for minimizing overall storage space requirements, minimizing workstations and infrastructure within the facility, and providing a potential reduction or elimination of operators (e.g. pickers) in downstream order fulfilment processes (i.e. reduction in labor requirements).

The method 100 may segregate or consolidate groups of pending orders into a dynamic group 11 that is made up of dynamic sets or "bubbles" 14 of orders that are compiled as a function of (i) which orders of the pending orders will be required within a user defined period of time, such as an ensuing user defined period (e.g. within the next hour, within the current day, etc.), and/or (ii) a range of orders defined by the available capacity of the facility order fulfilment processes (e.g. decanting operations or decant workstations 16, picking operations or pick workstations 20, packing operations or pack workstations 22, unit destinations in a sortation system 24, etc.). The individual orders within a dynamic bubble 14 and/or the dynamic bubbles 14 are continuously reevaluated and/or re-sequenced within the dynamic group 11. The method inspects and tracks the inbound inventory that is present at a forward pick location(s) 15, which include opportunistic decant workstations 16, to determine if the required items for orders in the dynamic group 11 are currently available at the forward pick locations 15 or if replenishment is needed to satisfy the current order needs.

Figure 1B:
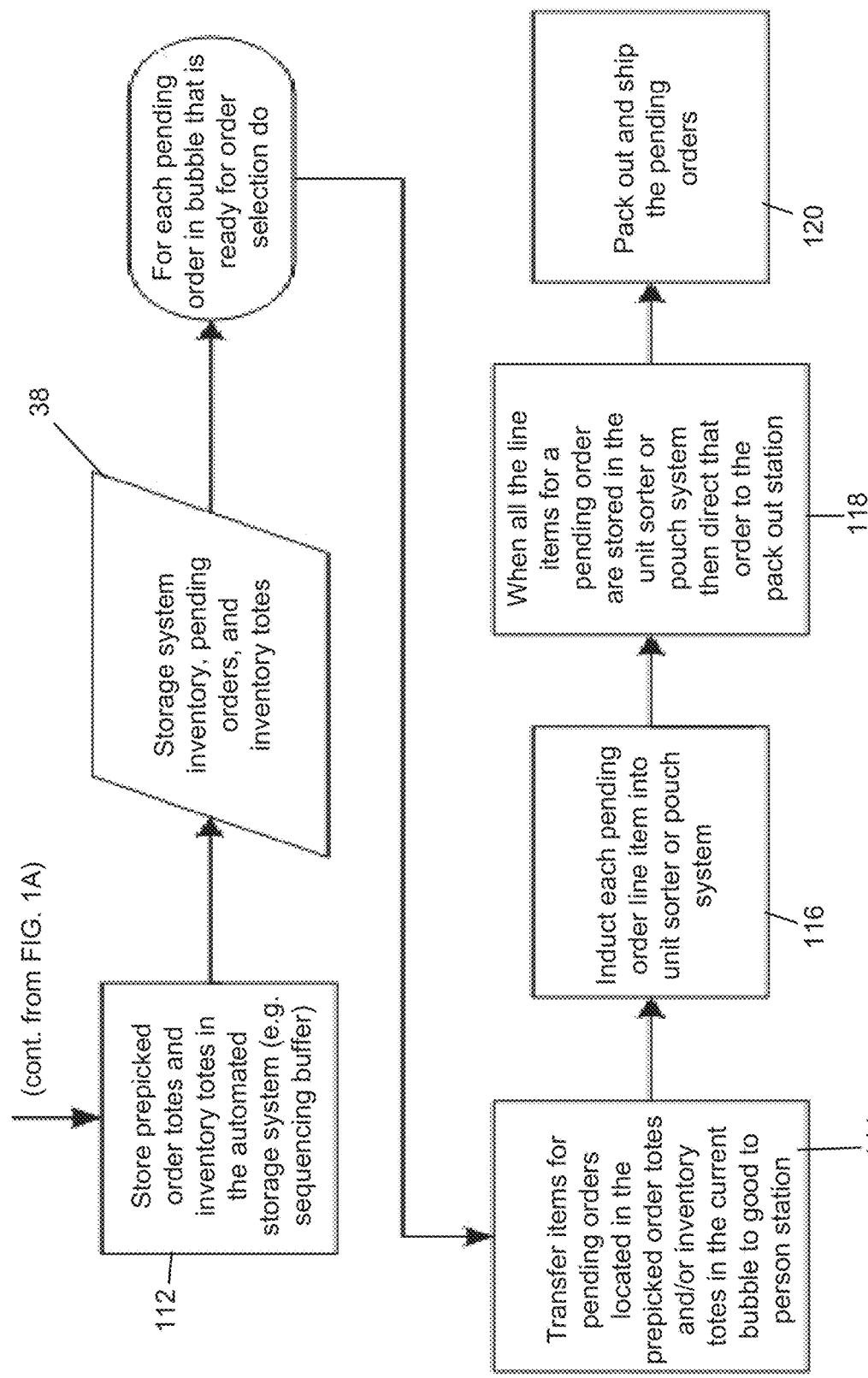

Referring to the illustrative embodiment of FIGS. 1A and 1B, a method 100 is provided for order fulfilment within an order fulfilment facility 8 and includes opportunistic picking of inbound items and replenishment items, in the form of vender cases, cartons, and/or batches of vendor items, as they are inducted into the order fulfilment facility. The order fulfilment facility includes an order management system 10, such as a warehouse management system (WMS) or a warehouse control system (WCS). The order management system 10 may include an adaptive software that continuously updates and reconfigures resource utilization based on order requirements, resource capacity, and facility inventory. The order management system 10 includes a list or database of pending orders 12. The method 100, with the order management system 10, creates 102 a dynamic group 11 having several dynamic sets or bubbles 14 each with multiple orders from the pending order list 12. The dynamic group 11 and dynamic bubbles 14 are created based on what orders will be filled over a user defined time period and/or as a function of the available capacity of downstream order fulfilment resources or processes (e.g. pick workstations 20, packing stations 22, sortation system 24, etc.). For example, a dynamic group 11 may include all orders that require fulfillment within a particular day and a dynamic bubble 14 may include all orders that will be concurrently or successively filled within the next half hour. A dynamic group 11 may include more or fewer orders and bubbles 14 based on the capacity/availability of downstream resources and processes.

Figure 2:
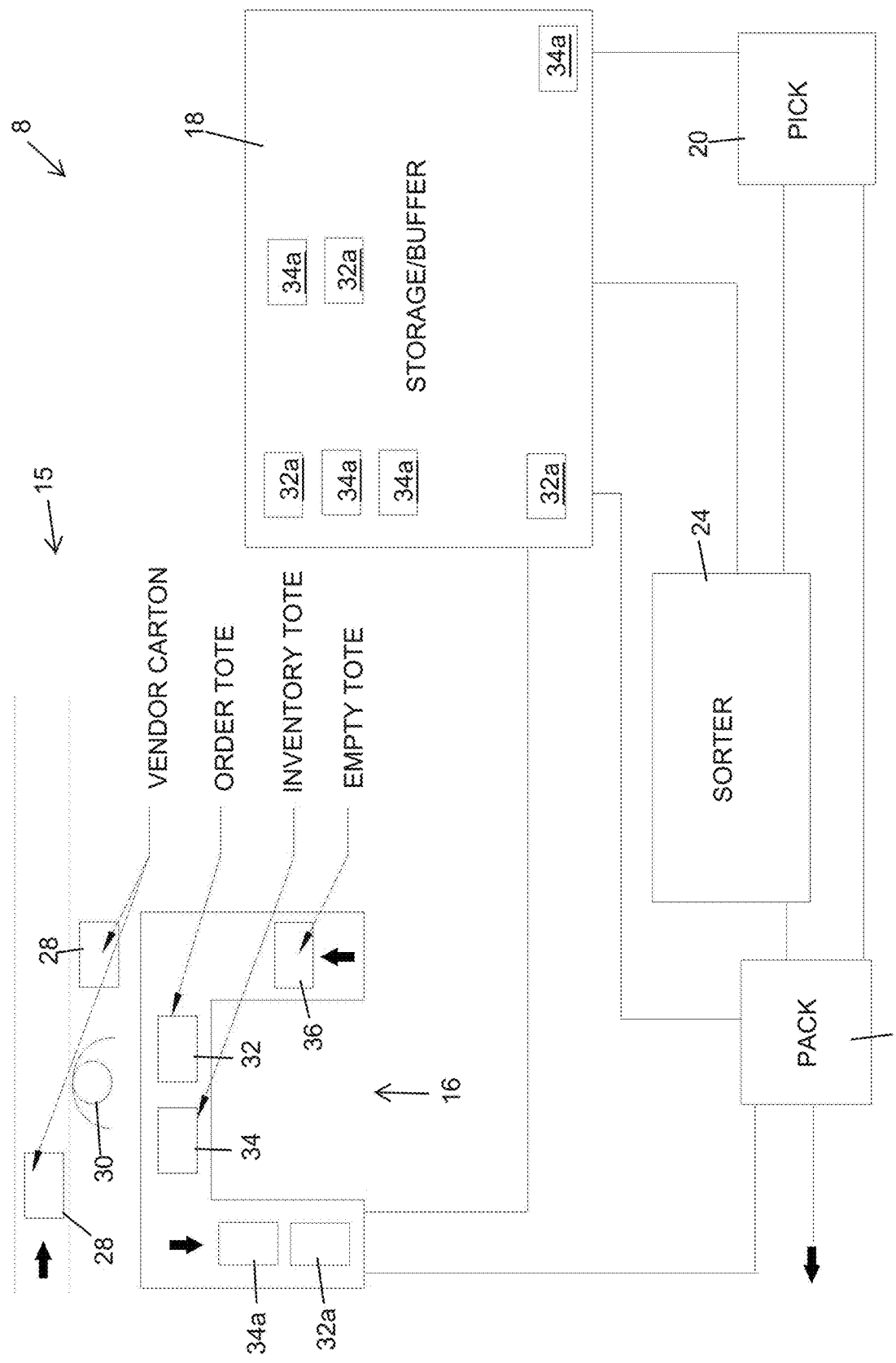
FIG. 2 is a top plan view of a decant workstation for opportunistic decant operations in the order fulfilment facility, in accordance with the present invention.
Figure 3:
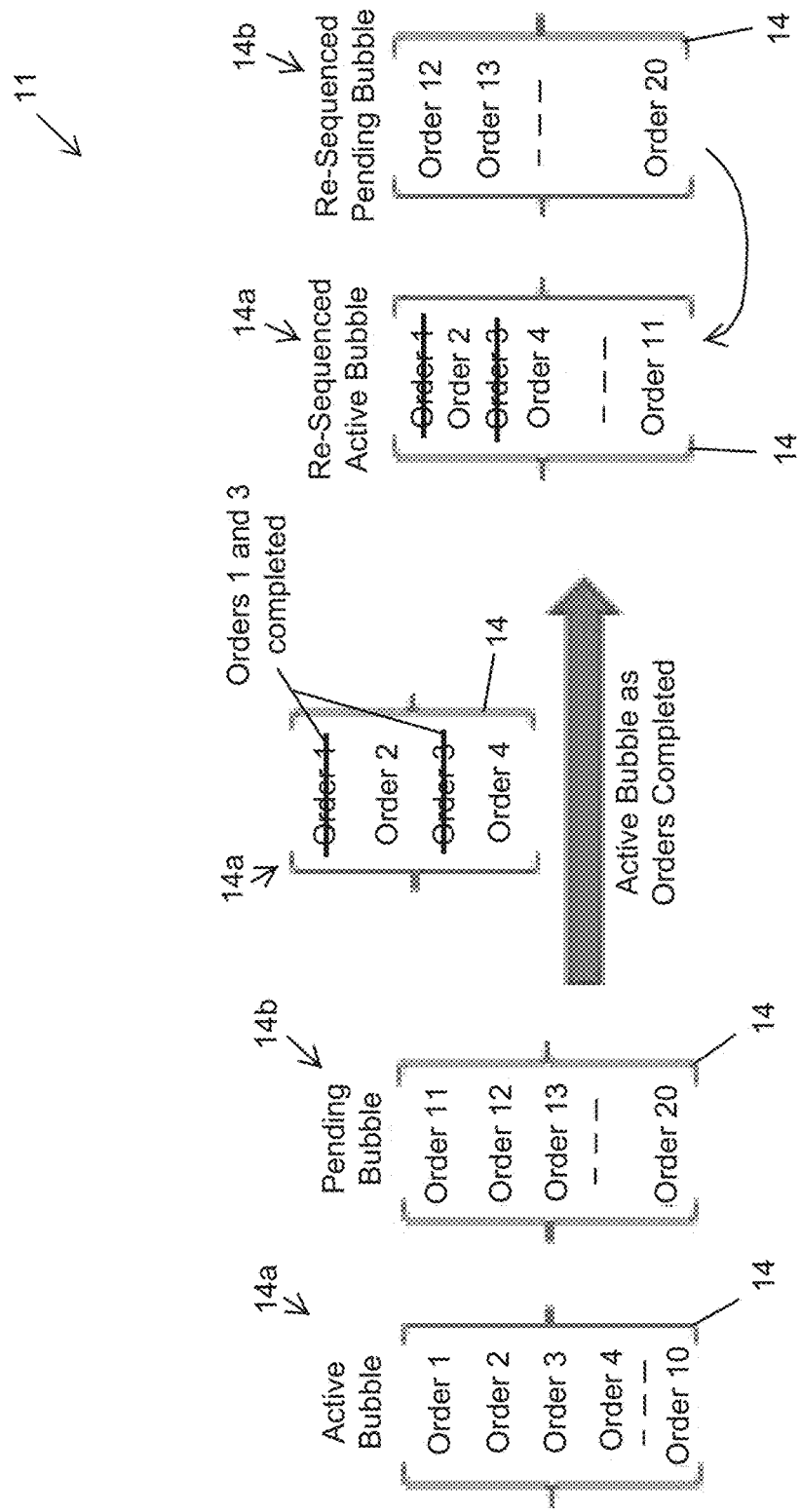
FIG. 3 is a diagram of a dynamic group of dynamic order sets for order fulfilment with opportunistic decant operations, depicting re-sequencing of orders between dynamic order sets, in accordance with the present invention.

The order fulfilment facility includes one or more decant workstation 16, an automated storage system or storage buffer 18, such as in the form of an automated storage and retrieval system, for example. The storage buffer may be referred to as a random buffer, in as much as the items and receptacles stored in the buffer are retrievable at random or at will without waiting for other items or receptacles to be retrieved ahead of the desired item. The facility includes one or more downstream workstations, such as one or more order picking workstations 20 and/or one or more packing workstations 22, for example (FIG. 2). The decant workstation 16 and other downstream workstations may be operated by human operators or robotic operators, such as goods to person (GTP) or goods to robot (GTR) workstations, automated or manual pouch sorters, or manually operated decant stations.

As depicted in FIG. 2, the order fulfilment facility includes a sortation system or sorter 24 downstream of the decant workstation 16. The sortation system 24 may include a unit sorter, pouch sorter, cross-belt sorter, tilt tray sorter, split tray or bombay sorter, or any other sortation system suitable for sorting, storing, sequencing, and releasing order items in an individual item manner. Preferably, the sorter 24 is capable of storing order items individually and sequencing or consolidating the individual items into a group or groups of items belonging to a particular order (i.e. a consolidated order item group. It will be appreciated that the buffer 18 and a sortation system may be integrated with one another such that individual order items may be consolidated into a group directly in the buffer 18 without the need to be transferred to a downstream picking workstation for further segregation prior to being transferred to a packing workstation. For example, the buffer 18 may be provided in the form of a pouch conveyor buffer. In such an embodiment, the buffer 18 provides a sequencer (i.e. sequencing buffer) operable to consolidate one or more items into a group for a particular order. Alternative to, or in addition to, the buffer 18, the order fulfilment facility may include manual storage systems.

The order management system 10 inspects 104 the inventory that is present in the forward pick location 15 (i.e. the inbound inventory being inducted and decanted, not to be confused with previously decanted inventory that is stored in the buffer 18) to determine if there are any shortfalls in required items to fill any of the orders in the current dynamic bubble 14a. If there are any shortfalls, the system 10, as part of inspection 104, creates a shortfall list or database 26 of items that are required but not present at the forward pick location 15 for filling the orders in the current dynamic bubble 14a. The management system 10 assigns a particular order from the dynamic bubble to a particular decant workstation 16. Based on the shortfall list 26, if any required order items are not available at the forward pick location 15, the order management system 10 orders or calls for 106 the delivery of vendor cases 28 (FIG. 2) or replenishment items to the forward pick location 15 and a particular decant workstation 16.

The method 100 enables the order management system to optimize decant operations for full vendor cases such that an entire vendor case may be pre-picked for orders in the dynamic group 11. By re-sequencing orders from pending dynamic bubbles 14b of the dynamic group 11 into the active or current dynamic bubble 14a, the method 100 may ensure that there are sufficient orders within the active bubble 14a to accept or claim all of the items in the full vendor case. As individual orders in the current dynamic bubble 14a are completed/fulfilled (i.e. decanted, buffered, sorted, and/or shipped), other orders from the pending dynamic bubbles 14b are continuously added or re-sequenced from the pending bubble 14b to the current bubble 14a. The selection of which orders in the pending dynamic bubble 14b to re-sequence to the current dynamic bubble 14a may be chosen as a function of the following: (i) required goods for the current dynamic bubble 14a, (ii) the full vendor cases available to be called up to satisfy at least some of the requirements of the current dynamic bubble 14a, and/or (iii) the requirements of the pending dynamic bubbles 14b that also require items from the full vendor cases available to be called up.

Preferably, the management system 10 only calls for 106 vendor cases that include at least one item that is required for an order in the current dynamic bubble 14a, which may reduce the workload on decant operators 30 so that they are not decanting vendor cases that contain items not currently required for an order in the current dynamic bubble 14a. However, it will be appreciated that during periods of low throughput or at any other time, the order management system 10 may direct vendor cases 28 to a decant station 16 to be decanted and inducted into the buffer 18 to replenish inventory in the buffer for orders in future dynamic bubbles 14b, such as in instances when resources are under-utilized or are otherwise available.

The method 100 includes the operator 30 simultaneously picking 108 required order items from the vendor cases 28 into order containers 32 and picking 110 non-required or residual items (if present) from the vendor cases into inventory containers 34. It is contemplated that additional order containers 32 may be presented at the decant workstation 16 for orders in pending dynamic bubbles 14b, thus permitting the operator to further deplete or decant vendor cases, which may reduce or substantially eliminate residual items from being decanted into inventory containers 34. In the illustrated embodiment of FIG. 2, the exemplary decant workstation 16 is configured to receive empty containers 36 from other order fulfilment processes. The decant workstation 16 presents containers to the operator 30 in an arrangement in which one or more order containers 32 are provided for receiving order items for orders being fulfilled during the decant process and one or more inventory containers 34 are provided for receiving non-required decanted items (if any non-required items are present). The containers 32, 34 may be any suitable container for transporting items within an order fulfilment facility and beyond, including totes, receptacles, shipping cartons, etc. Preferably, the container shape and dimensions are generally identical for all receptacles in the facility 8. The order containers 32 may contain complete orders if all required items for a particular order are decanted into the container 32 or partially filled orders if only a single order item or subset of the required order items are decanted into the container 32.

After receiving all of the available or assigned items at the decant workstation 16, the order containers represent pre-picked order containers 32a. The inventory totes, or segments, portions, or compartments of totes, may be filled in a stock keeping unit (SKU) pure manner, in which only one type of item or SKU are filled into that tote or segment of a tote. SKU pure loading of totes may be desired as it facilitates tracking of inventory and the totes within the order fulfilment facility and may facilitate efficient picking from the tote or segment of the tote. However, it will be appreciated that inventory totes, or segments of inventory totes, may be filled with a variety of different items or SKUs in a mixed SKU manner and the order management system 10 is operable track the inventory of items across many different totes and locations within the buffer 18. Once vendor items have been decanted into inventory totes 34, those totes represent filled or partially filled inventory totes 34a. Because the method 100 includes opportunistic picking during the decant process while continuously decanting non-required items from vendor cases 28 and storing those items in the buffer 18, it is possible that all of the items required for an order, such as a future order or an order in a pending dynamic bubble 14b, will be present in the buffer 18. As such, that future order may be fulfilled without any necessary decant operations, thus providing an example of the advantages of the method 100 with opportunistic decant operations. Another advantage provided by the method 100 is that because pre-picked, partially filled orders and inventory items are stored in the buffer 18 and held until all required order items are present and ready for sortation, consolidation and/or packing, any exceptions or shortfalls in inventory do not block or stall the operation of downstream picking workstations 20 or the packing station 22.

Once decanting of the vendor case 28 is completed or once the pre-picked order tote 32a or inventory tote 34a is filled, the method transfers and stores 112 the pre-picked order totes 32a and any inventory totes 34a in the buffer 18. The buffer 18 is controlled by the order management system 10 and stores the various totes until they are required for sortation, consolidation, and/or packing processes. The buffer 18 may operate in a substantially similar or identical fashion to the buffer disclosed and described in commonly assigned U.S. patent application Ser. No. 17/494,929, filed Oct. 6, 2021, the disclosure of which is hereby incorporated by reference herein in its entirety. The pre-picked order items and/or inventory items in the buffer 18 are held until all of the items required for an order or a portion of an order are present in the buffer 18. The order management system 10 tracks the items in the buffer 18 in a storage buffer inventory database 38. Once it is determined that all required order items are present in the buffer (in either pre-picked order totes 32a or inventory totes 34a) the method transfers 114 the totes containing the required order items to a picking workstation 20. An operator at the pick workstation 20 transfers the required order items from the tote(s) to a sorter 24 and the order items are inducted or stored 116 in the sorter 24. The sorter 24 is configured to receive, store, and track individual items and to consolidate or sequence the individual items into a group or grouping of order items. For example, the sorter 24 may be a pouch sorter and the operator at the picking workstation 20 picks each individual order item from the tote(s) to an individual pouch. The pouch is then stored in the sorter 24 until all of the items required for an order are present in the sorter 24.

For example, one group of items making up a portion of a particular order may be handled at one decant workstation 16 and stored in the buffer 18 in one pre-picked order tote 32a and another group of items that make up the remainder of the particular order may be handled at another decant workstation 16 and stored in the buffer 18 in another pre-picked order tote 32a. The first pre-picked order tote 32a may be released to the picking workstation 20 and the individual items therein transferred or picked to individual pouches in the sorter 24. The second pre-picked order tote 32a may be released to the picking workstation 20 at a later time (e.g. a few seconds or minutes after the first tote) and the individual items therein transferred or picked to individual pouches in the sorter 24. The sorter 24 then sequences all of the individual pouches into a consolidated order item group that contains all of the required items for that particular order. For example, the pouches are arranged or re-ordered sequentially with one another such that the items for the order are in one continuous line of pouches.

Once all of the items for that order are sequenced in the sorter 24, the order management system directs or transfers 118 the consolidated order item group to the packing station 22 and the order items are consolidated, transferred, or discharged 120 into a shipping carton. The method 100 may be adapted for use in any size order fulfillment facility and the order management system 10 can be configured to control multiple decant workstations 16, the buffer 18, pick workstations 20, packing stations 22, and sorters 24. The method is particularly useful for sequencing and directing order fulfilment processes of different areas of the order fulfilment facility and delivering all of the required items for an order to the same packing station 22 simultaneously. It will be appreciated that the method 100 and system 10 may be deployed or utilized with a minimal physical footprint such that the downstream picking workstations 20 and/or the downstream sorter 24 may be omitted and the order items may be sequenced and then transferred directly from the buffer 18 to the packing station 22.

Thus, the method and system provide for opportunistic picking or forward pick order fulfilment to begin during the decant process, thus referred to as opportunistic decanting. The order management system determines what items that are required for a pending order are depleted or in shortfall within the decant function and/or in the storage system. The order management system orders or directs vendor cases containing the required items to the decant function and operators at the decant workstations pick the required order items from the inbound vendor cases into order containers while simultaneously decanting any non-required vendor items into inventory containers. The method preferably re-sequences orders within a dynamic group such that all items in a full vendor case are claimed by pending order and decanted to order containers to fill orders within a current dynamic bubble, as opposed to decanting some of the vendor case into inventory containers. Thus, all items in full vendor cases are opportunistically decanted and thereby reduce the need for operators to pick items for pending orders as well as decant items into inventory. The order containers and any inventory items are stored in the storage buffer until all required items for an order are present in the buffer, at which time all of the required items are released to a downstream picking workstation, sorter, or packing station. The method with opportunistic decant may provide a reduction in facility space requirements, labor reduction, and resource reduction while improving facility throughput.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. An order fulfilment method for opportunistically decanting order items from a case of inbound items, said method comprising:

selecting at least one order from a pending order database with an order management system;

delivering inbound items to a decant workstation, the inbound items containing at least one item required for the selected order;

simultaneously picking required items for the selected order from the inbound items into one or more order receptacles and picking non-required items, when present, into one or more inventory receptacles, wherein the order receptacles containing the picked order items define pre-picked order receptacles comprising either of a partially complete order and a complete order;

transferring the pre-picked order receptacles and any inventory receptacles to an automated storage system;

determining, with the order management system, whether all of the required items for an order are present in the automated storage system in the pre-picked order receptacles or any inventory receptacles; and once it is determined that all required items for an order are present in the automated storage system, transferring all of the required order items from the automated storage system to a downstream order fulfilment process.

2. The method of claim 1, wherein the required items for an order are contained in at least one of the pre-picked order receptacles and wherein said transferring all of the required order items from the automated storage system comprises transferring the pre-picked order receptacles containing the required order items from the automated storage system.

3. The method of claim 1, wherein the required items for an order are contained in at least one of the pre-picked order receptacles and at least one of the inventory receptacles, wherein said transferring all of the required order items from the automated storage system comprises transferring the pre-picked order receptacles containing required order items and the inventory receptacles containing required order items from the automated storage system.

4. The method of claim 1, further comprising segregating, with the order management system, multiple orders from the pending order database into a dynamic group of orders to be handled along with one another, wherein the orders of a dynamic group are chosen as a function of at least one chosen from (i) which orders are required over an ensuing user defined period and (ii) available capacity at downstream order fulfilment processes.

5. The method of claim 4, wherein said segregating of orders into a dynamic group further comprises segregating the orders of the dynamic group into a plurality of dynamic sets of orders, wherein a first set of the plurality of dynamic sets of orders is to be processed ahead of the remainder of the plurality of dynamic sets of orders.

6. The method of claim 5, wherein as an order in the first set is completed, said method further comprising re-sequencing an order from one of the remainder of the plurality of dynamic sets of orders into the first set.

7. The method of claim 1, further comprising inspecting, with the order management system, an inventory of inbound items at the decant workstation and creating a shortfall database of order items that are required at the decant workstation but are not present at the decant workstation.

8. The method of claim 1, wherein the automated storage system comprises at least one chosen from a unit sorter, pouch sorter, cross-belt sorter, tilt tray sorter, split tray sorter, and a bombay sorter and is configured to sequence the required order items for the particular order into a consolidated order item group, and once all items are present in the consolidated order item group, transferring the consolidated order item group to a downstream packing station.

9. The method of claim 1, wherein the automated storage system comprises an automated storage and retrieval system and said method further comprising, after transferring the required items from the automated storage and retrieval system, transferring the required items to a downstream order fulfilment workstation and picking individual order items from at least one chosen from one of the pre-picked order receptacles and one of the inventory receptacles and placing the picked items into a sortation system that is configured to sequence the individual order items into a consolidated order item group, and transferring a completed consolidated order item group to a downstream packing station.

10. The method of claim 1, wherein the downstream order fulfilment process comprises at least one chose from a picking workstation, a sortation system, and a packing station.

11. The method of claim 1, wherein the downstream order fulfilment process comprises the packing station, and said method further comprising consolidating the required order items at the packing station from their respective receptacles into a shipping carton.

12. A method of order fulfilment with opportunistic decant operations to fulfil orders within an order fulfilment facility, said method comprising:

creating, with an order management system, a dynamic group having dynamic sets of multiple orders from a pending order database to be handled along with one another, wherein the orders are segregated into a particular dynamic set as a function of at least one chosen from which orders are required over an ensuing user defined period and available capacity of downstream order fulfilment processes within the order fulfilment facility;

for each order in the dynamic set, inspecting, with the order management system, an inventory of inbound items at a forward pick location in the order fulfilment facility;

creating a shortfall database of any order items that are required but are not currently present at the forward pick location;

delivering inbound items to the forward pick location, the inbound items delivered to that forward pick location containing at least one item required for a particular order as determined from the shortfall database; and simultaneously picking items required for one or more of the orders of the particular dynamic set from the inbound items into one or more order receptacles and picking non-required items, if present, into one or more inventory receptacles, wherein order receptacles containing picked order items each define a pre-picked order receptacle containing only items for orders in the dynamic set, and wherein the inventory receptacles contain inventory items required for either of other orders in the dynamic group or future orders in the pending order database which have not been segregated into a dynamic group.

13. The method of claim 12, further comprising transferring the pre-picked order receptacles and any inventory receptacles to an automated storage system.

14. The method of claim 13, further comprising:

determining, with the order management system, whether all of the required items for one of the orders of the dynamic set are present in the automated storage system in at least one chosen from one of the pre-picked order receptacles and one of the inventory receptacles;

wherein once all required order items for an order are present in the automated storage system, transferring the required order items in their respective receptacles from the automated storage system to a downstream sorter configured to consolidate the required order items for the particular order into a consolidated order item group, wherein the required items for an order of the dynamic set are contained in at least one of the pre-picked order receptacles; and consolidating the required order items for a particular one of the orders of the dynamic set with the sorter; and wherein once all items for the particular order are present in the consolidated order item group, transferring the consolidated order item group to a shipping carton.

15. The method of claim 13, further comprising:
determining, with the order management system, whether all of the required items for one of the orders of the wave are present in the automated storage system in at least one chosen from one of the pre-picked order receptacles and one of the inventory receptacles;
once all required order items for an order are present in the automated storage system, transferring the required order items in their respective receptacles from the automated storage system to a downstream packing station, wherein the required items for an order are contained in at least one of the pre-picked order receptacles; and
consolidating the required order items from their respective receptacles into a shipping carton.

16. The method of claim 15, wherein the required items for an order are contained in at least one of the pre-picked order receptacles and at least one of the inventory receptacles and wherein said transferring all of the required order items from the automated storage system comprises transferring the pre-picked order receptacles containing required order items and the inventory receptacles containing required order items from the automated storage system.

17. The method of claim 15, wherein said transferring all of the required order items from the automated storage system comprises transferring the required items to a downstream order fulfilment workstation and picking individual order items from respective receptacles and placing them into a sortation system configured to sequence the individual order items into a consolidated order item group.

18. The method of claim 17, wherein once all individual order items for the particular order are present in the consolidated order item group, said method further comprising transferring the consolidated order item group to the downstream packing station.

19. The method of claim 12, wherein if all individual order items required for the assigned order are picked to one or more order receptacles, said method further comprising transferring the order receptacles to a downstream packing station.

20. The method of claim 13, wherein the automated storage system comprises at least one chosen from a unit sorter, pouch sorter, cross-belt sorter, tilt tray sorter, split tray sorter, and a bombay sorter and is configured to sequence the required order items for the particular order into a consolidated order item group, and once all items for the particular order are present in the consolidated order item group, transferring the consolidated order item group to a shipping carton.

21. An order fulfilment method for opportunistically decanting order items from a case of inbound items, said method comprising:

selecting at least one order from a pending order database with an order management system;
delivering inbound items comprising items for at least one chosen from the selected order and another of the orders in the pending order database to a forward pick location;
simultaneously picking, at the forward pick location, items required for the selected order from the inbound items into one or more order receptacles and picking non-required items, if present, from the inbound items into one or more inventory receptacles, wherein the order receptacles containing picked inbound items define pre-picked order receptacles;
transferring the pre-picked order receptacles and any inventory receptacles to an automated storage system;
determining, with the order management system, whether all of the required items for an order are present in the automated storage system in one or both of a pre-picked order receptacle and an inventory receptacle;
once all required order items for an order are present in the automated storage system, transferring the receptacles containing the required items from the automated storage system to a picking workstation;
picking individual order items from the receptacles at the picking workstation and placing them into a sortation system configured to sequence the individual order items into a consolidated order item group for the selected order; and
transferring the consolidated order item group from the sortation system to a downstream packing workstation once all of the required items are present in the consolidated order item group.

22. The method of claim 21, wherein the required items for an order are contained in at least one pre-picked order receptacle and at least one inventory receptacle.

23. The method of claim 21, further comprising segregating, with the order management system, multiple orders from the pending order database into a dynamic group having a plurality of dynamic sets of orders to be handled along with one another, wherein the orders of a dynamic set, and said selecting an order comprises selecting an order from the dynamic set of orders.

24. The method of claim 23, wherein said segregating of orders into dynamic sets is determined as a function of at least one chosen from (i) which orders are required over an ensuing user defined period and (ii) available capacity of downstream order fulfilment processes.

25. The method of claim 21, further comprising inspecting, with the order management system, an inventory of inbound items at the forward pick location and creating a shortfall database of order items that are required but not present at the forward pick location.

* * * * *